(12) United States Patent
Basak et al.

(10) Patent No.: US 12,019,350 B2
(45) Date of Patent: Jun. 25, 2024

(54) MULTI-SEGMENT ELECTRO-OPTIC DEVICES WITH LOW LOSS RF DELAY LINES

(71) Applicant: NOKIA SOLUTIONS AND NETWORKS OY, Espoo (FI)

(72) Inventors: Juthika Basak, San Jose, CA (US); Douglas Gill, South Orange, NJ (US); Asres Seyoum, Franklin Park, NJ (US); Matthew Streshinsky, Taos, NM (US)

(73) Assignee: Nokia Solutions and Networks Oy, Espoo (FI)

( * ) Notice: Subject to any disclaimer, the term of this patent is extended or adjusted under 35 U.S.C. 154(b) by 5 days.

(21) Appl. No.: 17/561,071

(22) Filed: Dec. 23, 2021

(65) Prior Publication Data

US 2023/0205043 A1 Jun. 29, 2023

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01)

(58) Field of Classification Search
CPC ....... G02F 1/212; G02F 1/2255; G02F 1/2257
See application file for complete search history.

(56) References Cited

U.S. PATENT DOCUMENTS

| | | | |
|---|---|---|---|
| 9,519,162 B2 | 12/2016 | Ding et al. | |
| 9,559,779 B2 | 1/2017 | Ding et al. | |
| 9,874,767 B2 | 1/2018 | Ding et al. | |
| 10,168,596 B2 | 1/2019 | Williams et al. | |
| 10,451,903 B2 | 10/2019 | Ding et al. | |
| 10,466,567 B1 | 11/2019 | Vera Villarroel et al. | |
| 10,656,441 B2 | 5/2020 | Ding et al. | |
| 11,209,674 B2 | 12/2021 | Ding et al. | |
| 2011/0044573 A1* | 2/2011 | Webster | H04B 10/5053 385/3 |
| 2016/0062207 A1 | 3/2016 | Bai | |

(Continued)

OTHER PUBLICATIONS

Unpublished European Patent Application No. 21169364.3, filed Apr. 20, 2021 by applicant Nokia Solutions and Networks Oy.

(Continued)

*Primary Examiner* — Michael P Mooney
(74) *Attorney, Agent, or Firm* — Stratford Group Ltd.

(57) ABSTRACT

An electro-optic device, such as an optical modulator, comprises: a driver for generating a plurality of identical time-synchronized copies of an input electrical signal, and a photonic integrated circuit, including an optical waveguide structure and a plurality of phase-modulating electro-optical modulator segments. Each one of the modulator segments configured to receive a respective one of the plurality of the copies of the input electrical signal. Instead of incorporating a required phase delay between the copies of the input electrical signal into the driver structure, a multi-layer interconnect substrate is provided that includes a plurality of insulating layers alternating with a plurality of conductive layers. The plurality of conductive layers are configured to include a plurality of delay lines, each one of the plurality of delay lines electrically coupled in between the driver and the photonic integrated circuit configured to transmit a respective one of the plurality of copies of the first input electrical signal.

19 Claims, 10 Drawing Sheets

(56) References Cited

U.S. PATENT DOCUMENTS

2016/0363834 A1* 12/2016 Velthaus ............... G02F 1/2255
2017/0194310 A1*  7/2017 Evans ................... H01L 24/09
2018/0341164 A1* 11/2018 Williams .............. G02F 1/2257
2021/0135761 A1*  5/2021 Tanaka .................. G02F 1/225

OTHER PUBLICATIONS

Unpublished U.S. Appl. No. 17/560,809, filed Dec. 23, 2021 by applicant Nokia Solutions and Networks Oy.
Extended European Search Report for corresponding EP Application No. 22213371.2 dated Apr. 21, 2023.

\* cited by examiner

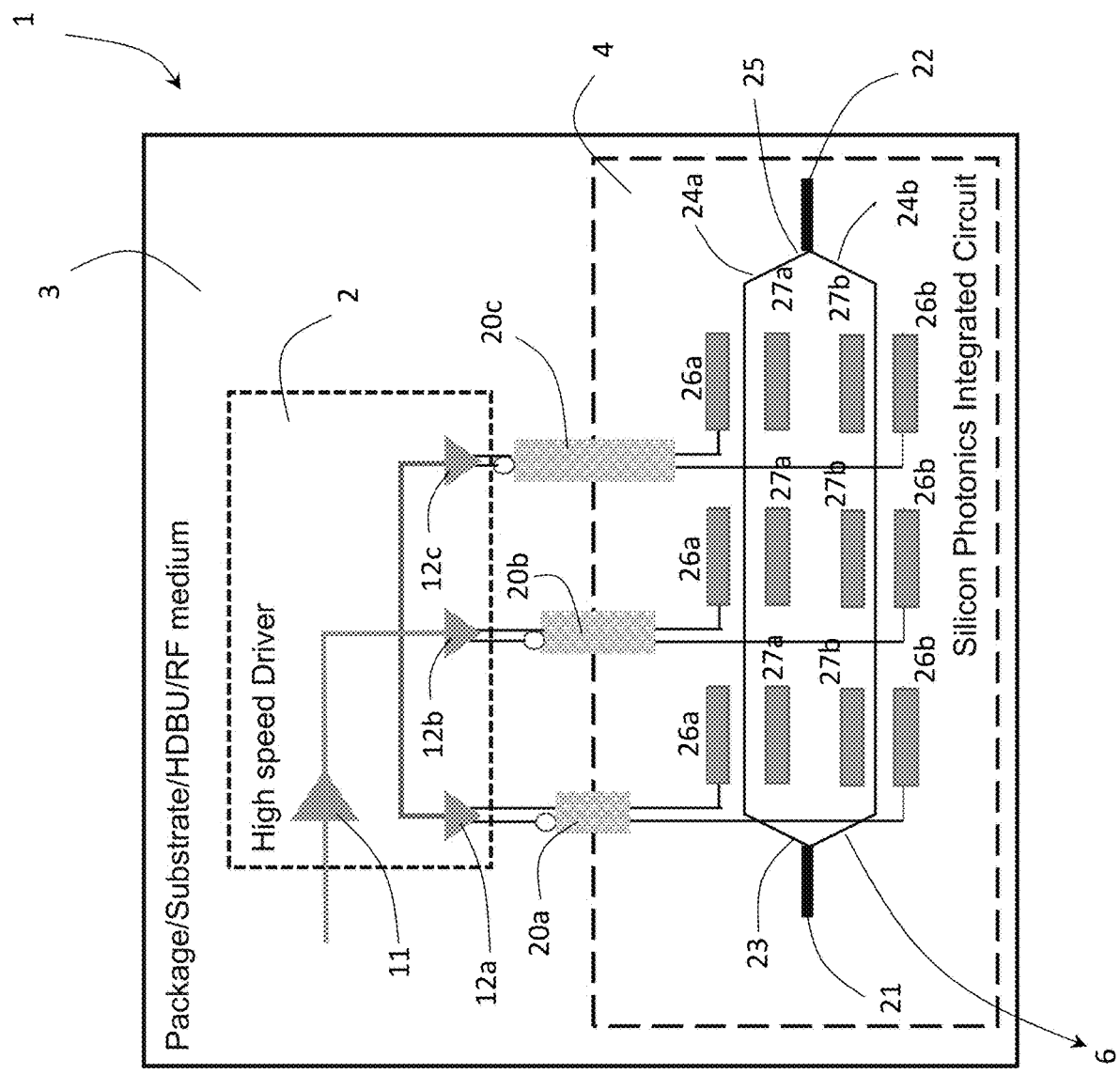
Figure 1 (NEW)

MULTI-SEGMENT ELECTRO-OPTIC DEVICES WITH LOW LOSS RF DELAY LINES

TECHNICAL FIELD

The present disclosure relates to multi-segment electro-optic devices, and in particular to multi-segment electro-optic devices with low loss RF delay lines.

BACKGROUND

As transmission data and symbol rates continually increase, electro-optic (EO) modulators used in communication systems need to operate at higher speeds and increased power efficiency to enable the realization of practical commercial product offerings that meet customer technical needs. Historically, this goal has been realized in silicon Photonic Integrated Circuits (PICs) by either designing traveling wave (TW) Mach-Zehnder modulators (MZMs) or by making EO modulators optically resonant. TW MZMs typically allow for higher bandwidth compared to a lumped drive mode EO modulators, with power consumption scaling much slower than linearly with frequency. However, the electrical transmission line RF loss, velocity mismatch between the optical and electrical waves, as well as increasing optical loss, can lead to diminishing returns on modulator performance with increasing length. Resonant modulators on the other hand, can suffer from the tradeoffs between optical cavity limited bandwidth and effective phase efficiency with increased Quality Factor.

One solution to these speed limitations is to incorporate multiple modulating segments into a single modulator device. Multiple shorter segments in an electro-optic (EO) modulator, allow for achieving higher phase shifts which are proportional to the total length, while the bandwidth may remain limited only to that of a single segment.

To increase bandwidth using multiple segments the electrical drive signal and the optical signal being modulated may be synchronized.

SUMMARY

Accordingly, a first apparatus includes an electro-optic device comprising:
an electronic driver having an array of electrical outputs for outputting, in parallel, electrical radio frequency (RF) drive signals;
a multi-layer interconnect substrate, including, at least, a dielectric layer and metallic RF transmission lines over the dielectric layer, each of the metallic RF transmission lines being electrically connected to receive one of the electrical drive signals from a corresponding one of the electrical outputs of the electronic driver; and
a photonic integrated circuit including an optical modulator having serially optically connected, electro-optical modulation waveguide segments, each of the segments having a control metallic RF transmission line electrically connected to receive one of the electrical RF drive signals from a corresponding one of the metallic RF transmission lines of the multi-layer interconnect substrate.

In any of the above embodiments, the first apparatus may also include that, at least, some of the metallic control RF transmission lines of the photonic integrated circuit have different lengths.

In any of the above embodiments, the first apparatus may also include that at least, some of the metallic RF transmission lines of the multi-layer interconnect substrate have different lengths.

In any of the above embodiments, the first apparatus may also include that some of the metallic RF transmission lines of the multi-layer interconnect substrate are located in a first vertical layer thereof and others of the metallic RF transmission lines of the multi-layer interconnect substrate are located in a different second vertical layer thereof, a layer of dielectric being located between the first and second vertical layers of the some and others of the metallic RF transmission lines.

In any of the above embodiments, the first apparatus may also include that a first of the metallic RF transmission lines of the multi-layer interconnect substrate has a segment located vertically, in the multi-layer interconnect substrate, over a second of the metallic RF transmission lines of the multi-layer interconnect substrate.

In any of the above embodiments, the first apparatus may also include that a metallic layer of the multi-layer interconnect substrate is located to provide electrical shielding between the some and others of the metallic RF transmission lines of the multi-layer interconnect substrate.

In any of the above embodiments, the first apparatus may also include that the multi-layer interconnect substrate includes a first cavity having a portion of the electronic driver located therein, and a second cavity having a portion of the photonic integrated circuit located therein.

In any of the above embodiments, the first apparatus may also include that at least, some of the metallic RF transmission lines of the multi-layer interconnect substrate are vertically electrically connected to the corresponding electro-optical modulation waveguide segments in the second cavity.

In any of the above embodiments, the first apparatus may also include that at least some of the metallic RF transmission lines of the multi-layer interconnect substrate extend underneath the photonic integrated circuit in the second cavity.

In any of the above embodiments, the first apparatus may also include that the electronic driver is configured to output electrical RF driver signals from the array of electrical outputs thereof in a temporally synchronized manner.

In any of the above embodiments, the first apparatus may also include that the photonic integrated circuit includes a second optical modulator having serially optically connected, electro-optical modulation waveguide segments, each of the segments of the second optical modulator having a control metallic RF transmission line electrically connected to receive one of the electrical RF drive signals from a corresponding one of the metallic RF transmission lines of the multi-layer interconnect substrate.

In any of the above embodiments, the first apparatus may also include that at least some of the metallic RF transmission lines of the multi-layer interconnect substrate electrically connected to one of the optical modulators are in a different vertical layer of the multi-layer interconnect substrate than, at least, some of the metallic RF transmission lines of the multi-layer interconnect substrate electrically connected to the other of the optical modulators.

In any of the above embodiments, the first apparatus may also include that some of the metallic RF transmission lines of the multi-layer interconnect substrate electrically connected to different ones of the optical modulators have segments vertically overlapping in the multi-layer interconnect substrate.

In any of the above embodiments, the first apparatus may also include that a metallic layer is located between the metallic RF transmission lines of the multi-layer interconnect substrate electrically connected to the one of the optical modulators and the metallic RF transmission lines of the multi-layer interconnect substrate electrically connected to the other of the optical modulators.

In any of the above embodiments, the first apparatus may also include that a portion of the photonic integrated circuit is located in a cavity in the multi-layer interconnect substrate and some of the RF transmission lines of the multi-layer interconnect substrate electrically connected to each of the optical modulators extend underneath the portion of the photonic integrated circuit located in the cavity.

BRIEF DESCRIPTION OF THE DRAWINGS

Some example embodiments will be described in greater detail with reference to the accompanying drawings, wherein:

FIG. 1 is a schematic block diagram of an example electro-optic device including a segmented optical modulator, electrical driver therefor, and RF interconnection substrate;

DETAILED DESCRIPTION

Figure 2:
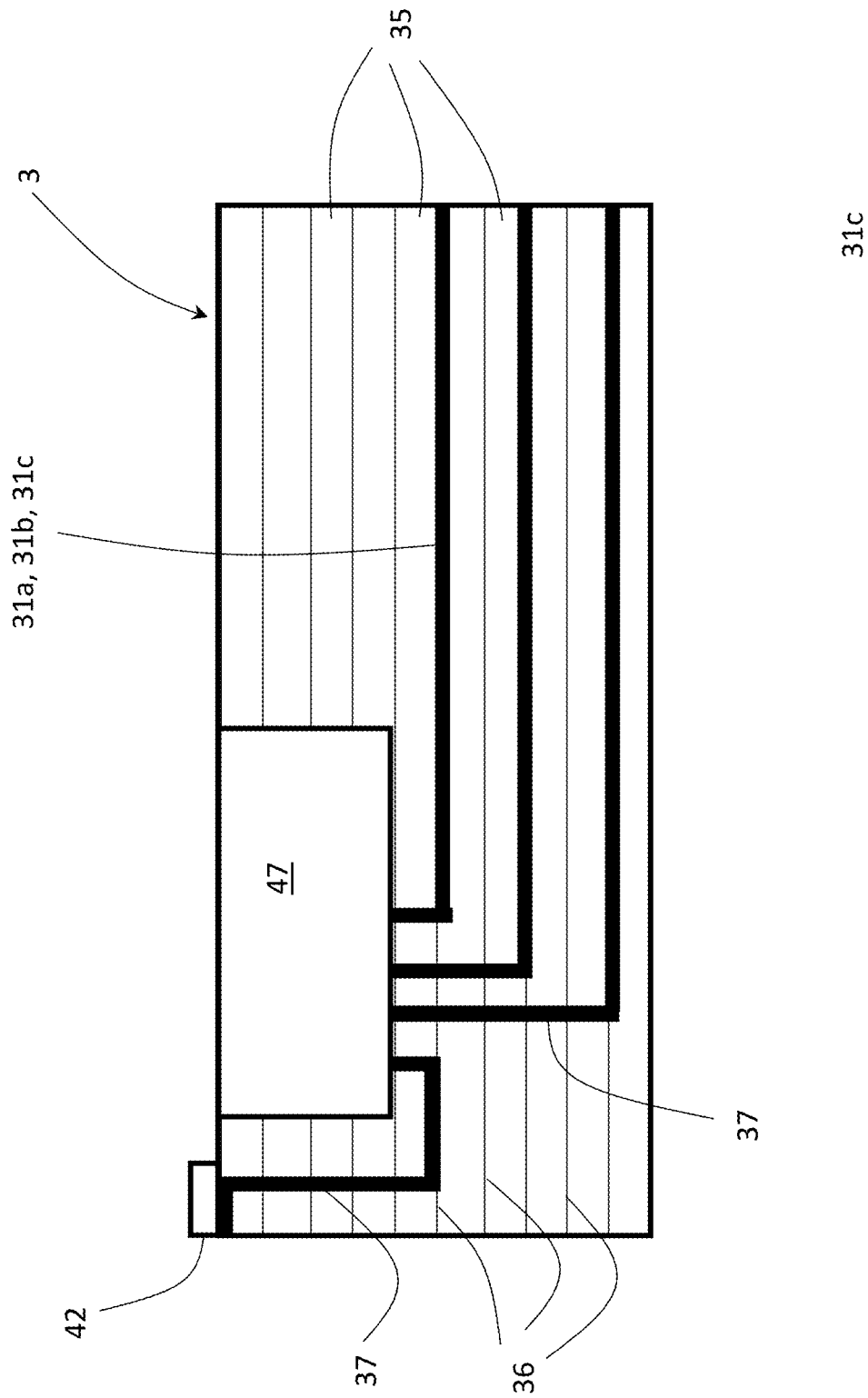
FIG. 2 is a cross-sectional view of a multi-layer interconnect substrate.

While the present teachings are described in conjunction with various embodiments and examples, it is not intended that the present teachings be limited to such embodiments. On the contrary, the present teachings encompass various alternatives and equivalents, as will be appreciated by those of skill in the art.

With reference to FIG. 1, an electro-optic device 1 comprises an electronic driver 2, an RF medium 3, e.g. a multi-layer interconnect substrate, and a photonic integrated circuit (PIC) 4, which includes a segmented, optical modulator 6, e.g. a Mach-Zehnder optical data modulator (MZM) or a resonant-type optical data modulator. The electronic driver 2 includes an input stage 11, which generates an input electrical driver signal, and a plurality of output stages, e.g. three output stages 12a, 12b and 12c, each of which typically generates an approximately identical, about time synchronized, electrical driver signal to be delivered to one of the optical modulation segments of the optical modulator 6.

Transmission lines 20a, 20b and 20c with varying time delay, may be provided on the multi-layer interconnect substrate 3, the photonic integrated circuit (PIC) 4 other some substrate therebetween. Schematically, 20a, 20b and 20c provide the overall transmission lines with delays on the multiple copies of the electrical signals, designed to match the corresponding delay on the optical signal traveling through an optical waveguide between segments. As an example, the time delay on the first transmission line element(s) 20a could be=0, the second 20b=t seconds, the third 20c=2t seconds. Correspondingly, the delay on the optical signal from the first segment to segment would be t seconds, and the second to the third segment would be another t seconds. This ensures the electrical and optical signals are both synchronized.

The optical modulator 6 includes an input optical waveguide 21 for receiving an input optical carrier from a light source, e.g. laser, (not shown), and an output optical waveguide 22, for launching a modulated output optical signal. The input optical carrier is divided into two sub-beams by an input splitter 23, e.g. a 1×2 optical Y-junction coupler. Light of the sub-beams travel along largely parallel first and second optical waveguide arms 24a and 24b to an output combiner 25, e.g. a 1×2 optical Y-junction coupler, which combines the two sub-beams into the modulated output optical signal. The modulated output optical signal is output via an optical connector 29, e.g. a surface optical connector on the PIC 4, or an edge optical connector in the PIC 4.

A plurality of phase-modulating, electro-optical modulator segments, are disposed along each of the two optical waveguide arms 24a and 24b, respectively. Each of the modulator segments may comprise a differential transmission line, e.g. a first plurality of signal segments 26a along one side of first optical waveguide arm 24a, a first plurality of ground segments 27a along the opposite side of the first optical waveguide arm 24a, a second plurality of signal segments 26b along one side of second optical waveguide arm 24b, and a second plurality of ground segments 27b along the opposite side of the second optical waveguide arm 24b. The ground segments and the signal segments may be interchanged. The modulator segments are typically radio frequency (RF) traveling wave electrodes for the Mach-Zehnder Interferometers (MZI) or resonant-type optical modulators.

In between the electronic driver 2 and the modulator 6, the RF medium 3 may comprise a substrate built using organic High Density Build Up (HDBU) technology, ceramics or any other high speed, RF compatible, material platform, including back end of the line (BEOL) layers of the silicon photonics process. The RF medium 3 may include a plurality of high-speed RF transmission lines, e.g. RF transmission lines 31a, 31b and 31c, one connected to each of the plurality of output stages of the electronic driver 2 RF. Typically, the RF transmission lines are configured for >100 Gbps and 3 dB bandwidth frequencies in the range of 80-90 GHz, but lower speeds may be possible. Each RF transmission line 31a-31c electrically couples one of the output stages of the electronic driver 2 to the RF transmission lines of a corresponding one of the modulator segments on the PIC 4. The lengths of the RF transmission lines 31a, 31b and 31c of the multi-layer interconnect substrate 3 are such that the electrical RF drive signals propagate therethrough to the corresponding modulation segments in approximate synchrony with arrival therein of the same wavefront of the optical signal being modulated. In embodiments where the output stages 12a, 12b 12c, deliver RF driver signals to the array of transmission lines 31a, 31b, and 31c of the substrate 3 at about the same time, propagation of said RF signals through the transmission lines 31a-31c provide relative delays to synchronize said RF signals with arrival of a portion of the light-to-be-modulated in the various modulation segments of the optical modulator 4.

The electro-optic device 1 offers the following advantages: 1) The loss from the transmission lines on such platforms are expected to be less than the loss on typical material platforms used for high speed RFICs, such as InP or SiGe. 2) One or more of properties, such as impedance, propagation delay and/or loss of such transmission lines, may be monitored tightly during their fabrication. 3) The combination of highly linear and low loss delay lines on one or combination of both of the multi-layer interconnect substrate 3 and the PIC 4 provides a very compact, high performance solution.

The RF transmission lines 31a, 31b and 31c may be fabricated in a multi-layer interconnect substrate 3 in which the electrical signals from the electronic driver 2 propagate in the same or different layers that have similar other electromagnetic properties. The RF medium 3 may be constructed with metal and with materials having more desirable RF properties, e.g., dielectric having lower RF thermal sensitivity than semiconductor of many optical PICs, whereby a channel pitch of 80-125 µm may be achieved. For this reason, the interconnect substrate 3 may maintain a more constant relative delay between the RF signals propagating on different RF transmission lines therethrough. If all the RF transmission lines 31a, 31b and 31c are designed on embedded, or internal conductive layers 36 of the substrate 3, with the outermost conductive layers of the substrate 3 being grounded, the properties, and particularly the delays are minimally impacted by packaging and assembly variations; for example, the presence or absence of underfill in a bump bonded region of a device. Furthermore, the different signal conductive layers may be separated with 'ground plane levels' ensuring a very high degree of isolation between signals on different conductive layers 36. This approach also ensures high linearity of the signal.

The RF transmission lines 31a, 31b and 31c of the substrate 3 further delivers the electrical RF drive signals to the PIC 4. Additional RF delay may be applied to one or more of these RF drive signals using linear, low loss delay lines on the PIC 4, as hereinafter described.

With reference to FIG. 2, a cross section of an example multi-layer RF interconnect substrate 3 or board includes a plurality of electrical insulator, e.g. dielectric, layers 35 alternating with a plurality of electrical conductor layers 36. The electrical insulator layers 35 may be comprised of an organic material, such as is used in conventional High Density Build Up (HDBU) processes, or a ceramic material, such as is formed in High Temperature Co-Fired Ceramic (HTCC) or a Low Temperature Co-Fired Ceramic (LTCC), or an inorganic dielectric material such as silicon dioxide, as in the back end of a silicon or glass or other interposer. The electrical conductor layers 36 may be configured, e.g. patterned, to form desired conductive traces, e.g. RF transmission lines 31a, 31b and 31c. The conductive layers 36 may comprise any suitable electrical conductor(s), e.g. a metal such as copper. Vias 37 are filled with one or more electrical conductors, i.e., the same or different electrical conductor as in the electrical conductor layers 36, and may be configured, e.g. etched, vertically through one or more if the electrical insulator layers 35 to contact electrical conductor traces in adjacent electrical conductor layers 36. In case of a multi-layer HDBU substrate, RF medium 3 may be configured, e.g. etched, to include cavities, e.g. cavity 47, for receiving electrical or optical components, e.g. the electronic driver 2 and the PIC 4.

Figure 3A:
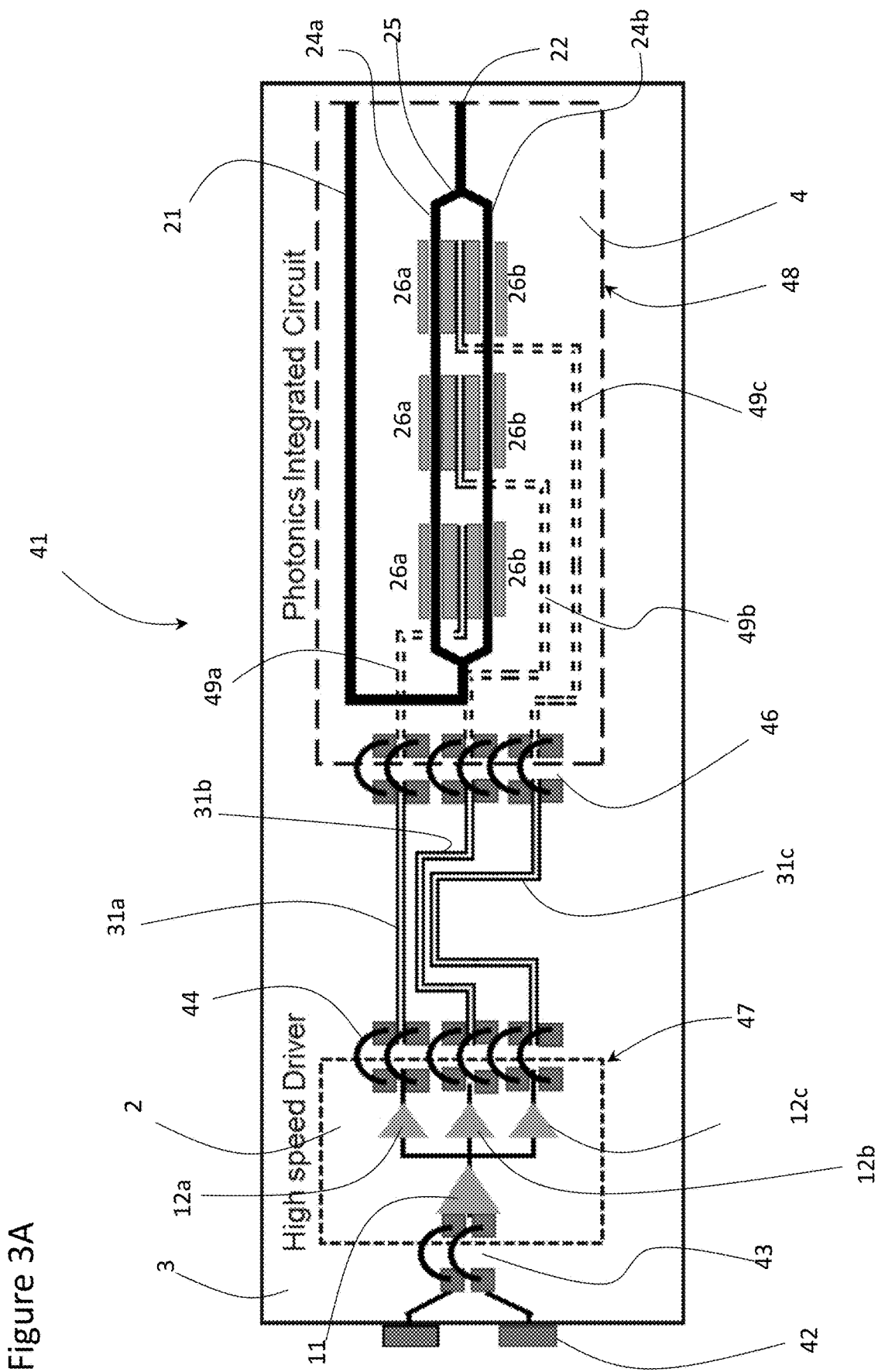
FIG. 3A is a schematic top view of an example of the electro-optic device of FIG. 1.
Figure 3B:
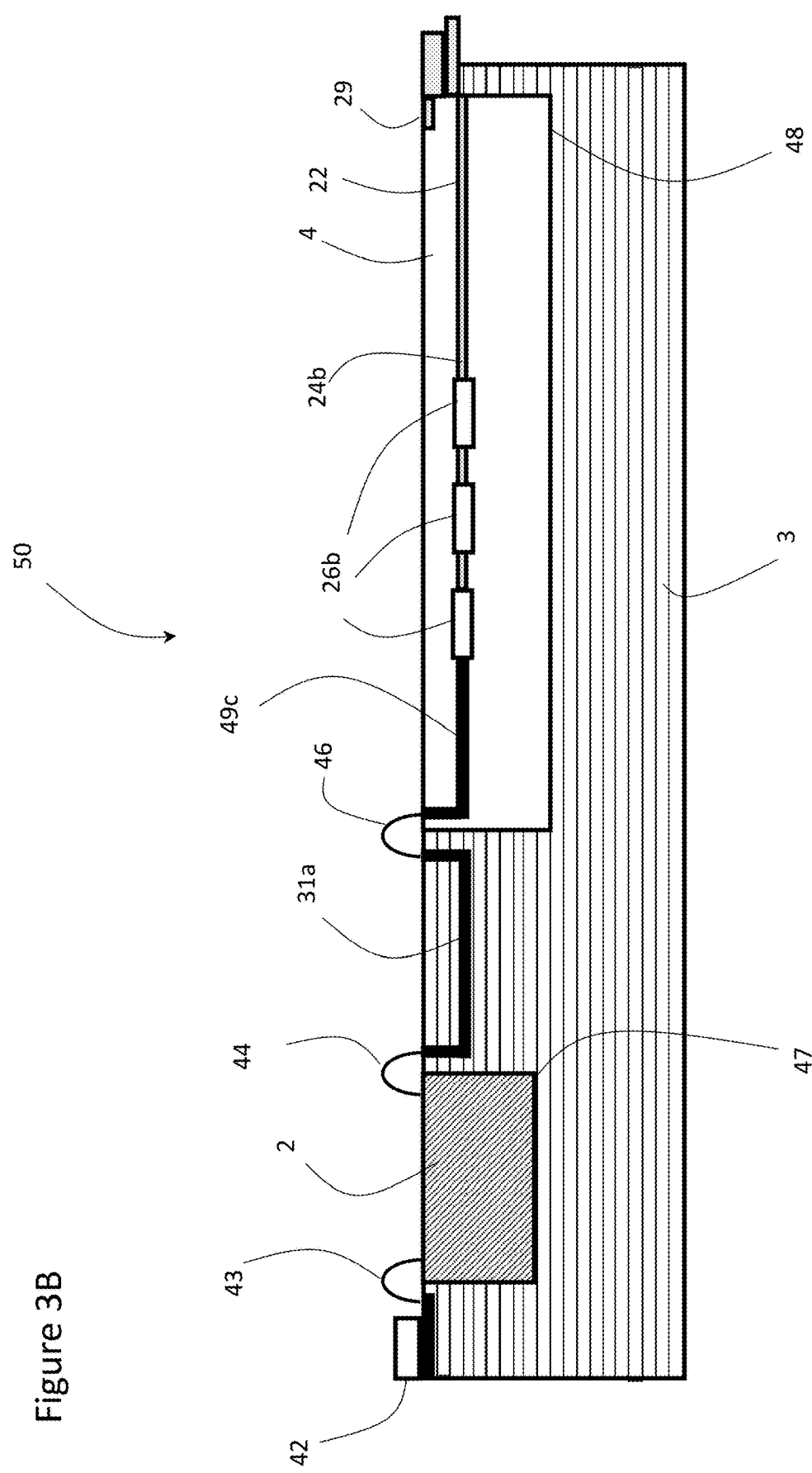
FIG. 3B is a cross-sectional view of the electro-optic device of FIG. 3A.

An example of an electro-optic device 41, in which appropriate relative propagation delays between the different RF driving signals are produced by an array of RF transmission lines 31a, 31b and 31c within the multi-layer interconnect substrate 3 of FIG. 1, is illustrated in FIGS. 3A and 3B. The high-speed electrical RF drive signals may be transmitted from an external source to electrical contacts 42 on or at an edge of the multi-layer interconnect substrate 3 and subsequently transmitted to the electronic driver 2, via a suitable electrical connection 43, e.g. an array of wire-bonds between electrical connect pads. The electrical RF driver signal are transmitted from the parallel array of outputs of the electronic driver 2 to the RF transmission lines 31a, 31b and 31c within a multi-layer interconnect substrate 3 via suitable electrical connection 44, e.g. a parallel array of wire-bonds between electrical connect pads of the outputs and an array of electrical connect pads at ends of the RF transmission lines 31a, 31b, and 31c. Finally, the electrical RF drive signals are transmitted from the RF delay lines 31a, 31b and 31c within a multi-layer interconnect substrate 3 to the PIC 4 using a suitable electrical connection 46, e.g. wire-bonds between electrical connect pads. The electronic driver 2 and the PIC 4 may be mounted at least partially within cavities 47 and 48 formed in the multi-layer interconnect substrate 3.

The total propagation delay of one of the electrical RF drive signals may be a sum of a propagation delay produced by the corresponding one of the RF delay lines 31a, 31b and 31c within a multi-layer interconnect substrate 3 and a propagation delay produced by an RF transmission line 49a, 49b and 49c in the PIC 4, as disclosed in concurrently filed U.S. patent application Ser. No. 17/560,809, by Douglas Gill, Juthika Basak, Asres Seyoum, and Matthew Streshinsky, titled "RF DELAY LINE FOR SEGMENTED OPTICAL WAVEGUIDE MODULATOR", which is incorporated herein by reference in its entirety.

Figure 4A:
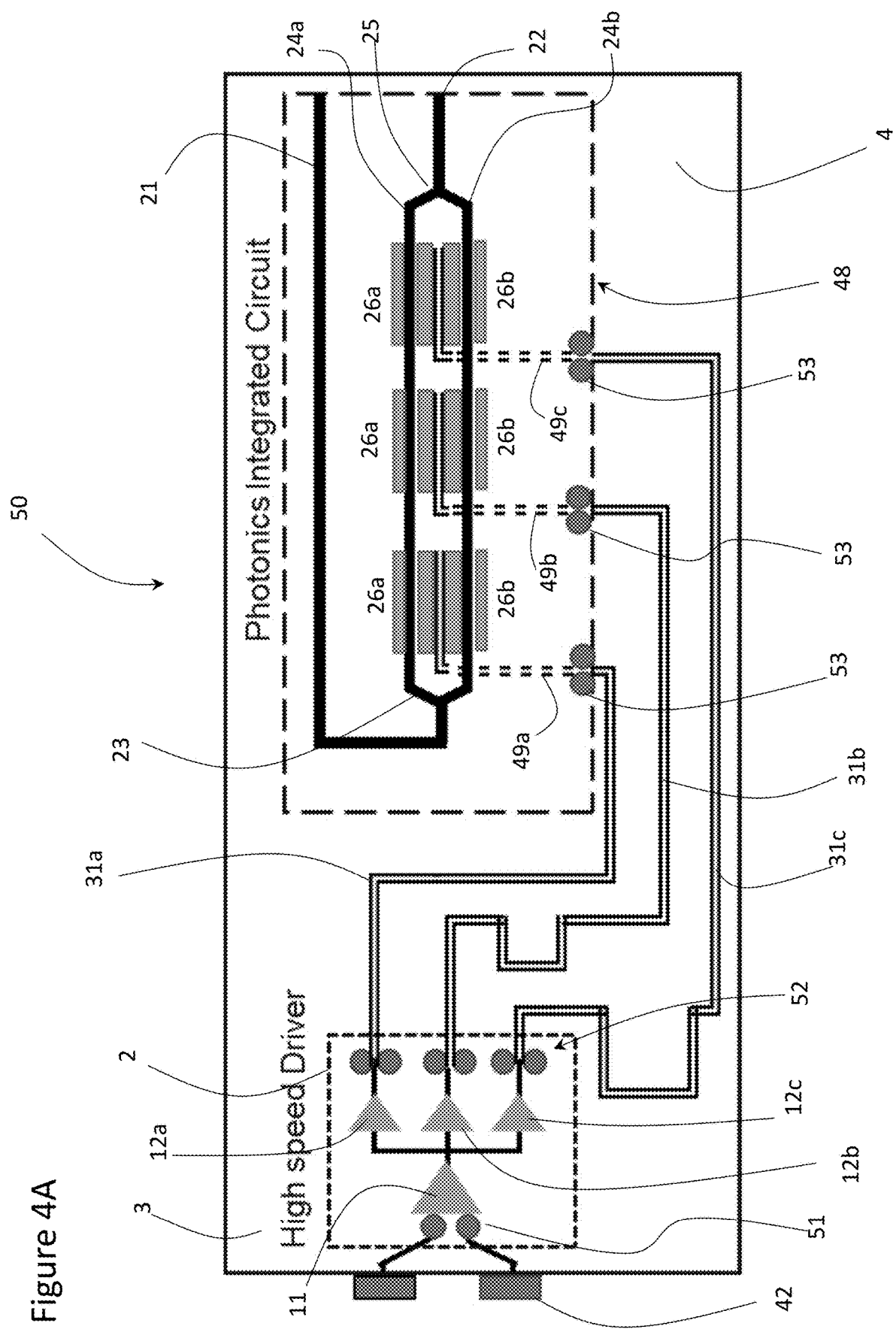
FIG. 4A is a schematic top view of another example of the electro-optic device of FIG. 1.
Figure 4B:
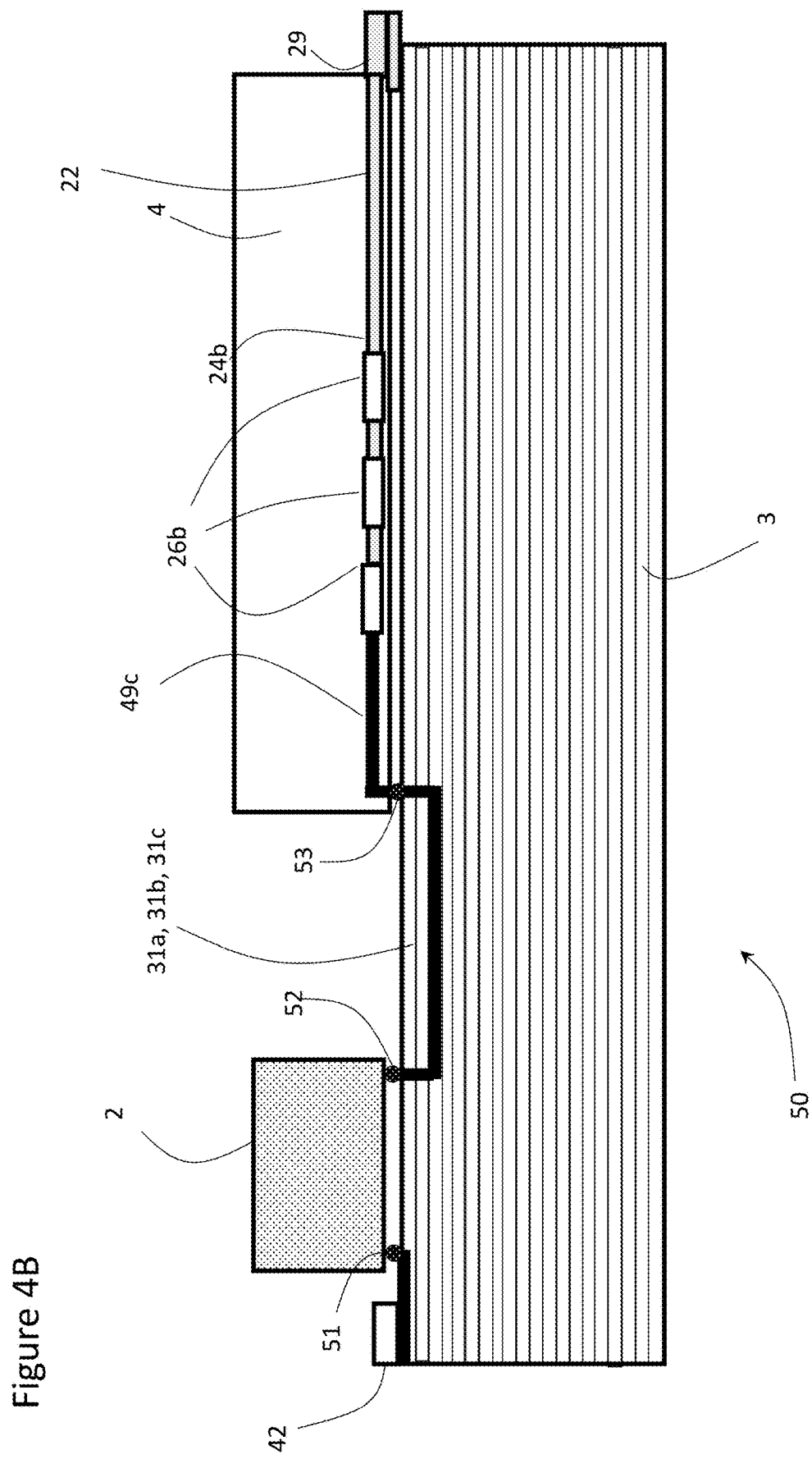
FIG. 4B is a cross-sectional view of the electro-optic device of FIG. 4A.

A second example 50 of the electro-optic device 1 of FIG. 1 is illustrated in FIGS. 4A and 4B. In FIGS. 4A-4B, elements with already used reference numerals have the same structure and/or function as elements of another figure with the same reference numerals. In FIGS. 4A-4B the surface electrical connections 43, 44 and 46 of FIGS. 3A-3B, e.g. the wire-bond connections, provided on an upper surface of the electronic driver 2, the multi-layer interconnect substrate 3, and the PIC 4 are replaced by more precise flip-chip electrical connections 51, 52 and 53, respectively. The flip-chip electrical connections 51, 52 and 53 are between facing surfaces of the electronic driver 2 and the multi-layer interconnect substrate 3 and between facing surfaces of multi-layer interconnect substrate 3 and the PIC 4, e.g., solder bumps and pads provided along the top of the multi-layer interconnect substrate 3. The RF transmission lines 49a, 49b and 49c in the PIC 4, may all be the same length, and therefore provide no additional relative propagation delay between the different RF transmission line paths or, alternatively, may provide some additional relative delay.

In the first two examples, in which the overall propagation delay is a combination of a delay provided by one of the RF transmission lines 31a, 31b and 31c within a multi-layer interconnect substrate 3 as well as the corresponding one of the RF transmission lines 49a, 49b and 49c in the PIC 4. Thus, total propagation delays can be modified, as desired, using processing or post-processing steps in the semiconductor fabrication flow.

Figure 5A:
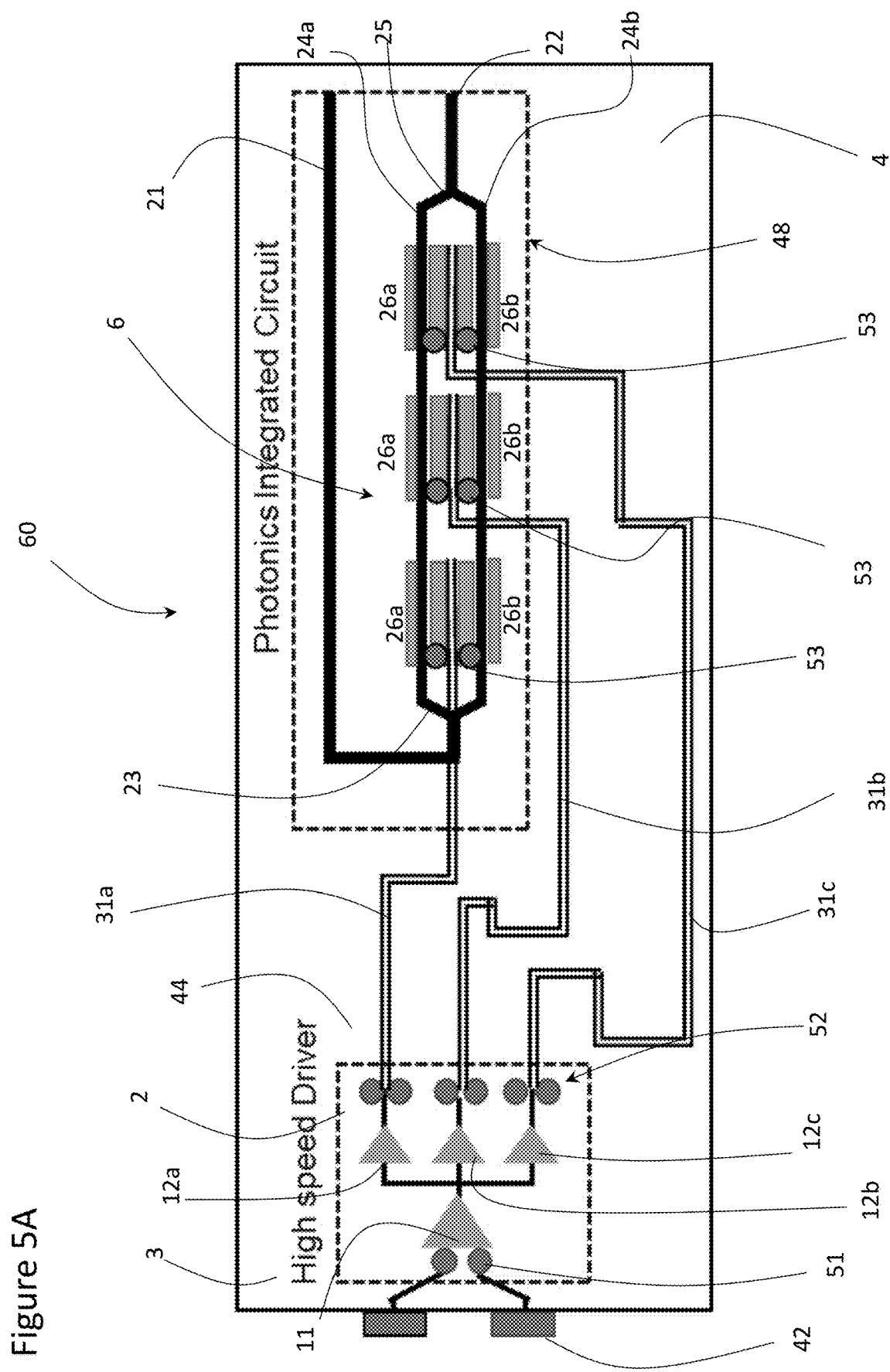
FIG. 5A is a schematic top view of another example of the electro-optic device of FIG. 1.
Figure 5B:
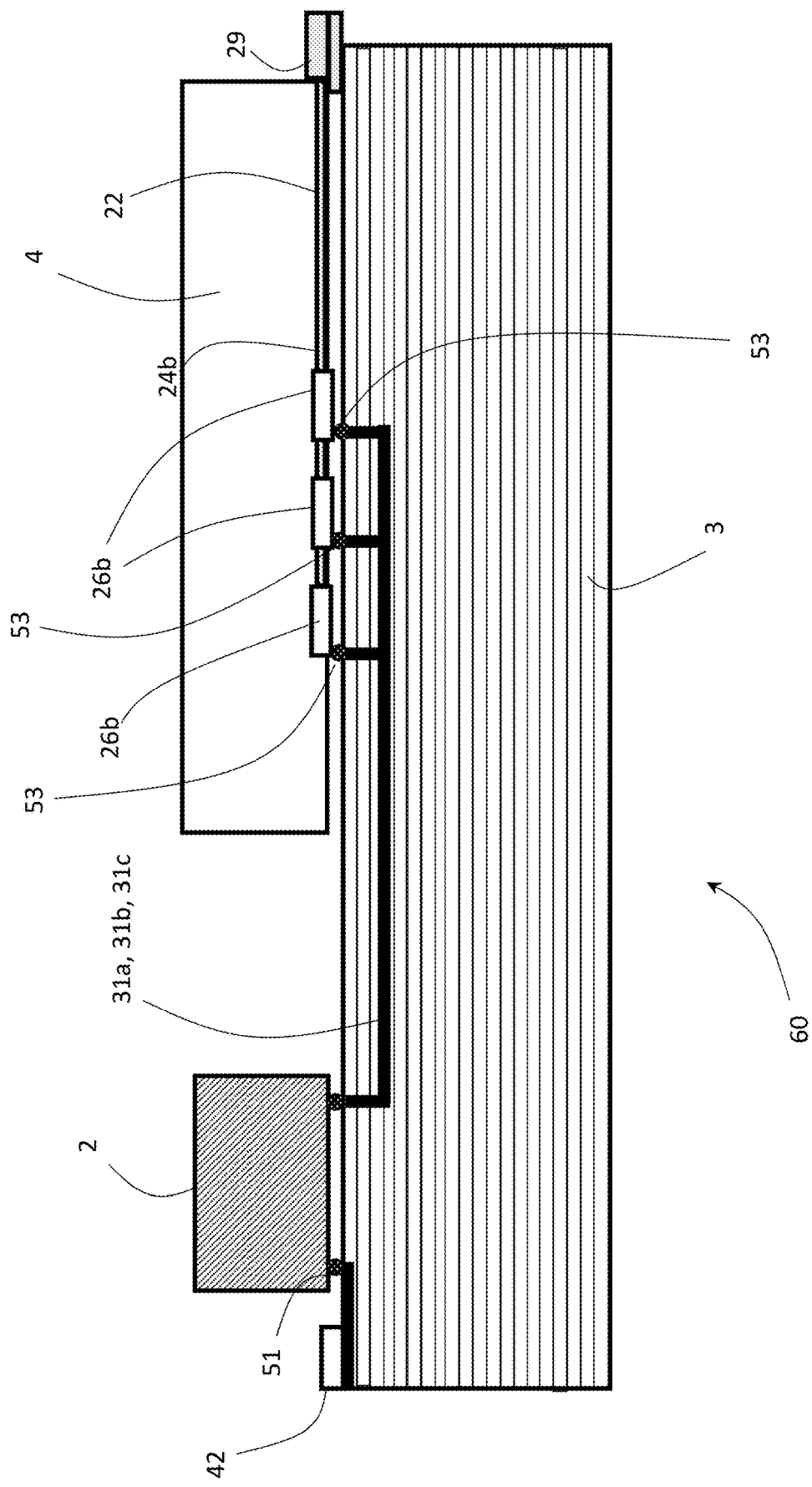
FIG. 5B is a cross-sectional view of the electro-optic device of FIG. 5A.

A third example 60 of the electro-optic device 60 of FIG. 1 is illustrated in FIGS. 5A and 5B. In FIGS. 5A-5B elements with the same reference numerals as other elements of another figure have the same structure and/or function as those other elements. In FIGS. 5A-5B, relative propagation delays between RF driver signals are provided by the RF transmission lines 31a, 31b and 31c within a multi-layer interconnect substrate 3. The flip-chip bonding connects ends of the RF transmission lines 31a, 31b and 31c to the high speed modulating segments 26a, 26b, 27a and 27b on the multilayer interconnect substrate 3 without causing any additional relative propagation delays, in the PIC 4, between the different RF drive signals.

Figure 6A:
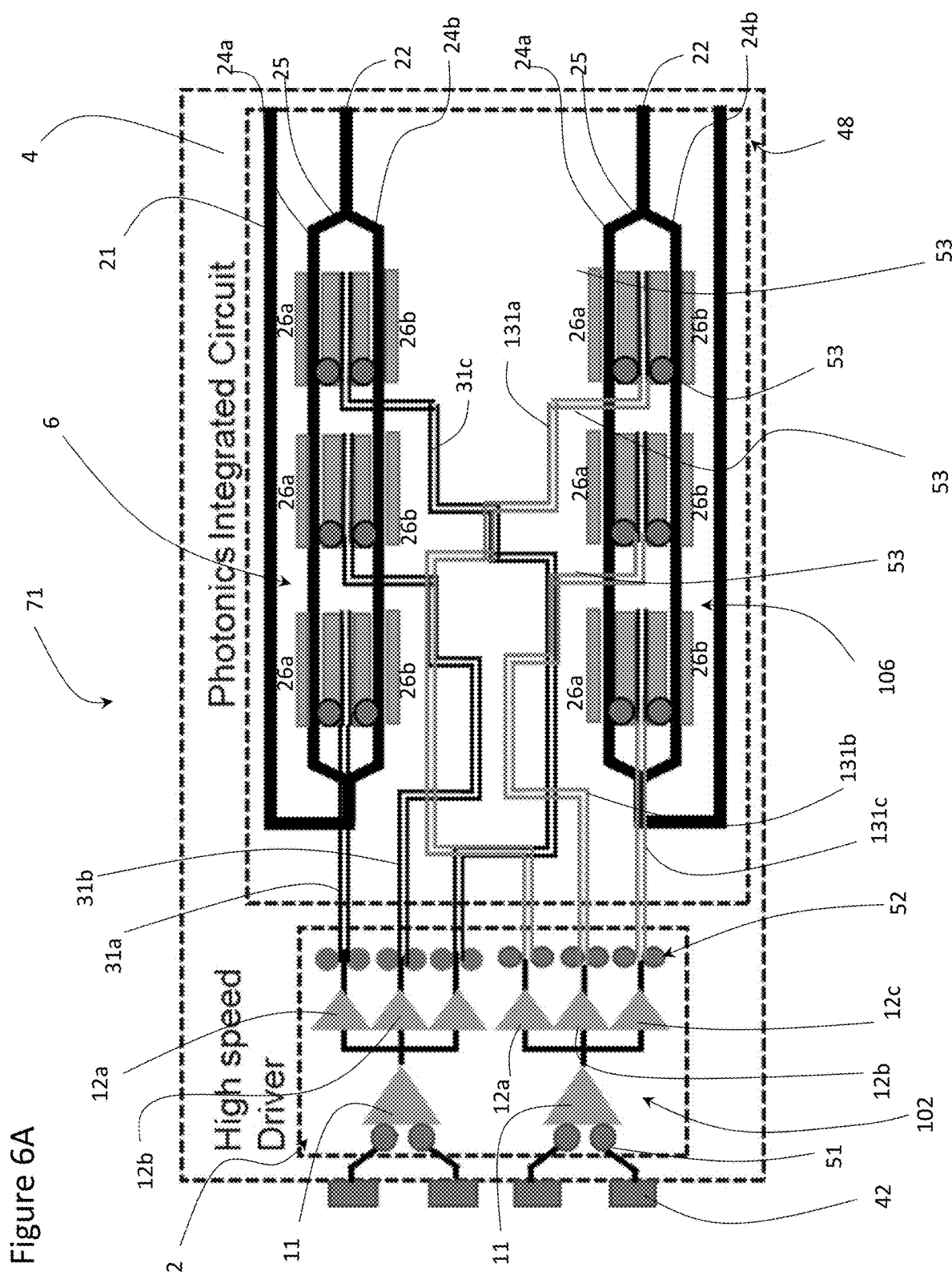
FIG. 6A is a schematic top view of another example of the electro-optic device of FIG. 1.
Figure 6B:
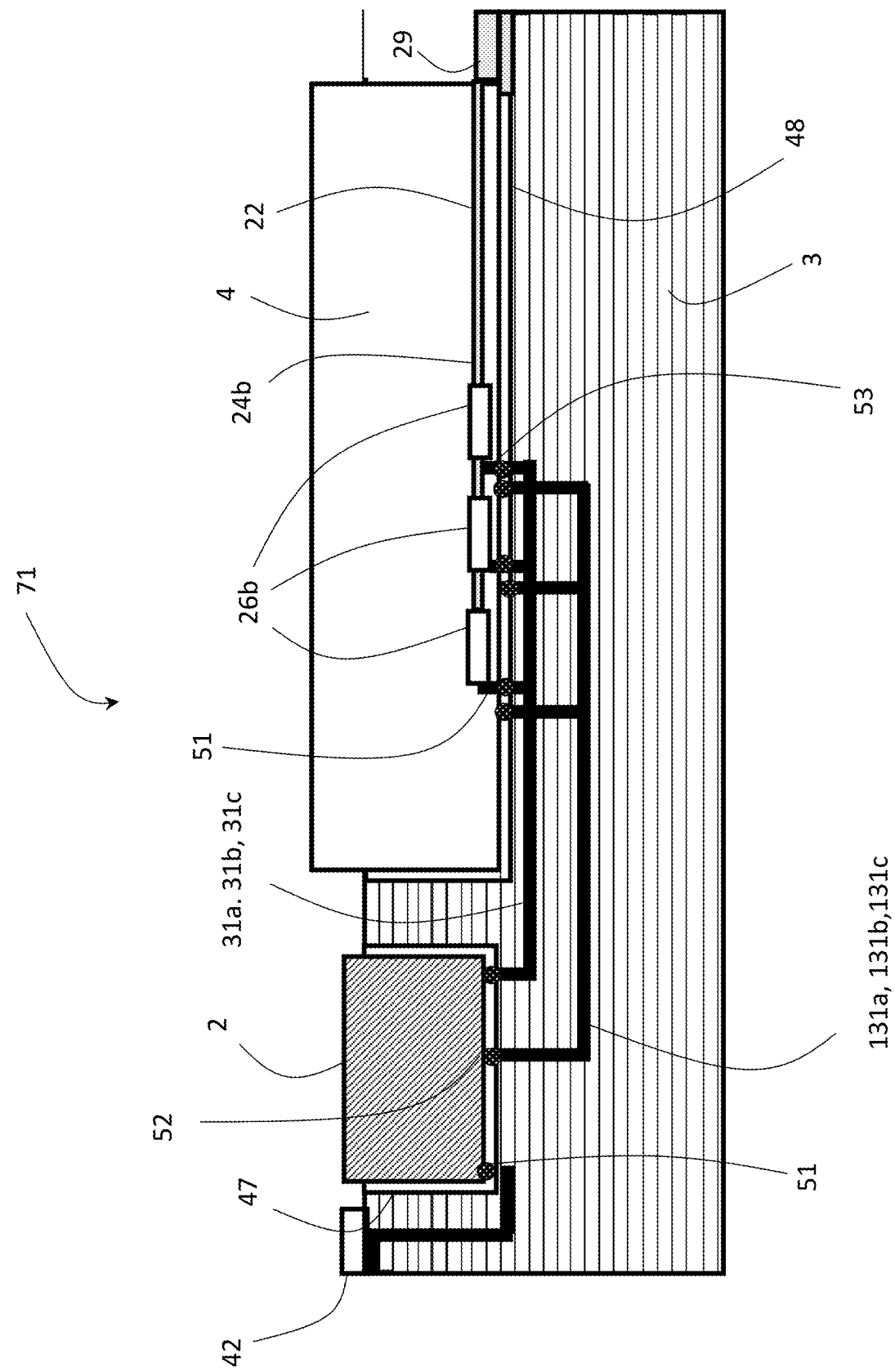
FIG. 6B is a cross-sectional view of the electro-optic device of FIG. 6A.

A fourth example 71 of the electro-optic device 1 of FIG. 1 is illustrated in FIGS. 6A and 6B. In FIGS. 6A-6B, elements with already used reference numerals have the same structure and/or function as elements of another figure with the same reference numerals. The electro-optic device 71 may enable a more compact PIC 4, because the relative delays between different electrical RF drive signals are substantially only produced by the RF transmission lines 31a, 31b and 31c within the multi-layer interconnect substrate 3. Since some, if not all, of the conductive layers 36 on the multi-layer interconnect substrate 3 are embedded, the substrate area under the PIC 4 may be used for RF transmission lines 31a, 31b, 31c, 131a, 131b and 131c with little or no physical overlap. If need be, some small sections of the RF transmission lines 31a, 31b 31c, 131a, 131b and 131c may also be added on the PIC 4 to optimize the total area, looking top-down. With the multi-layer interconnect substrate 3, some or all of the RF transmission lines 31a, 31b and 31c may be formed on different electrical conductor layers 36, but preferably all of the RF transmission lines 31a, 31b and 31c are on a same layer, and all of the RF transmission lines 131a, 131b and 131c are on a same layer, different than RF transmission lines 31a, 31b and 31c. The different electrical conductor layers 36 may be separated from each other by ground plane(s) comprising at least a portion of one of the other electrical conductor layers 36 and two of the electrical insulator layers 35 in between the electrical conductor layers 36 including the RF delay lines 31a, 31b and 31c, thereby providing electrical isolation from the other electrical RF drive signals transmitted in the different RF transmission lines 31a, 31b and 31c and the RF transmission lines 131a, 131b and 131c. Accordingly, some or all of RF transmission lines 31a, 31b and 31c may be superposed with RF transmission lines 131a, 131b and 131c, e.g. overlap each other in a top-down view, (FIG. 6A) with at least one of the insulator layers 35 therebetween. Superposing the RF transmission lines 31a, 31b and 31c can enable implementation of a larger range of relative propagation delays, integration of multiple channels, and/or tighter pitches thereby reducing the area of the PIC 4 and/or the multi-layer interconnect substrate 3. Furthermore, the electronic driver 2 may comprise a plurality of driver structures, e.g. i.e. at least a second electronic driver channel 102, may be provided on the same driver chip. Also, a plurality of optical modulators 6, i.e. at least a second optical modulator 106 with similar or different structure than the first optical modulator 6, may be provided on the same PIC 4, e.g., to support in-phase and quadrature phase modulation and/or polarization multiplexing. Also, some of the transmission lines 31a, 31b and 31c from the first optical modulator 6 may laterally overlap the RF transmission lines 131a, 131b and 131c, which produce similar relative propagation delay for electrical RF drive signals to operate the second optical modulator 106. In the multi-layer interconnect substrate 3, the different arrays of transmission lines 31a-31c and 131a-131c may be electrically and physically isolated by at least one electrical insulator layer 35 therebetween. A large proportion, e.g. <50%, preferably <75%, even more preferably <90%, of the RF transmission lines 31a, 31b and 31c from the first modulator 6 and the RF transmission lines 131a, 131b and 131c from second modulator 106 may extend underneath the PIC 4 further reducing the size of the electro-optic device 71. RF transmission lines 31a-31c may be on the same layer as each other and different from RF transmission lines 131a-131c, which would be separated in the top-down view as shown on FIG. 6A. Similarly RF transmission lines 131a-131c may be on the same layer as each other but different than RF transmission lines 31a-31c, which ensures that the delay relationship between the RF transmission lines 131a-131c is maintained, since different layers may have slightly different group delay. The flip-chip electrical connections 51, 52 and 53 may be between facing surfaces of the electronic driver 2 and the multi-layer interconnect substrate 3 and between facing surfaces of multi-layer interconnect substrate 3 and the PIC 4, e.g. solder bumps and pads provided along the top of the multi-layer interconnect 3 or the bottom on the cavities 47 and 48, if provided.

It is to be noted that several other combinations of the examples described above are possible. All the examples described here provide manufacturing tolerant relative RF propagation delays between RF drive signals operating the different high speed modulating segments 26a, 26b, 27a and 27b of the optical modulators 6, but are often able to maintain a high level of linearity and low RF signal losses. The RF transmission lines 31a, 31b and 31c within the multi-layer interconnect substrate 3 can enable high signal integrity in space efficient configurations, making some embodiments suitable for pluggable electro-optic devices, chip on-board or co-packaged high-speed optical transceivers, for applications ranging from optically unamplified links, amplified links, and point-to-point to mesh networks.

Glossary

BEOL—back end of line refers to metal layers used in the manufacture of integrated circuits and photonics integrated circuit that are above the silicon layer used for active devices.
EO—Electro-optic
High Density Interconnect (HDI)
HDBU Substrate—High-density build-up Substrate
High Density Ceramic Substrate
High Density Interconnect PCB (Printed Circuit Board) Substrate Like PCB (SLP)
PAM—Phase amplitude modulated PIC—Photonic integrated circuit HDBU—High Density Build-Up HDI—High Density interconnect
IC—Integrated circuit
ISI—Intersymbol interference
MZM or MZI—Mach-Zehnder interferometric modulator
PCB—Printed circuit board
RF—Radio frequency electro-magnetic wave form
RFIC—Radio Frequency Integrated Circuit
TW—A traveling wave optical modulator is an electro-optic modulator where the length of the RF/optical interaction region is greater than a substantial fraction of the wavelength of the RF frequency of interest for a given application. For example, the RF/optic interaction region is, at least, larger than ~1/10 of the wavelength of the RF operating frequency, the optical modulator is a traveling wave optical modulator.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. An electro-optic device comprising:
an electronic driver having an array of electrical outputs for outputting, in parallel, electrical radio frequency (RF) drive signals;
an RF medium including, at least, a dielectric layer and metallic RF transmission lines over the dielectric layer, each of the metallic RF transmission lines being electrically connected to receive one of the electrical RF drive signals from a corresponding one of the array of electrical outputs of the electronic driver; and
a photonic integrated circuit including a first optical modulator having serially optically connected, electro-optical modulation waveguide segments, each of the segments having a control metallic RF transmission line electrically connected to receive one of the electrical RF drive signals from a corresponding one of the metallic RF transmission lines of the RF medium; and
wherein a portion of the photonic integrated circuit is located in a cavity in the RF medium and some of the RF transmission lines of the RF medium electrically connected to the first optical modulator extend underneath the portion of the photonic integrated circuit located in the cavity.

2. The device according to claim 1,
wherein a first of the metallic RF transmission lines of the RF medium is located in a first vertical layer thereof and a second of the metallic RF transmission lines of the RF medium is located in a different second vertical layer thereof, another dielectric layer being located between the first and second vertical layers of the first and second of the metallic RF transmission lines.

3. The device according to claim 1, wherein, at least, some of the metallic control RF transmission lines of the photonic integrated circuit have different lengths.

4. The device according to claim 1, wherein at least, some of the metallic RF transmission lines of the RF medium have different lengths.

5. The device according to claim 1, wherein a first of the metallic RF transmission lines of the RF medium has a segment located vertically, in the RF medium, over the second of the metallic RF transmission lines of the RF medium.

6. The device according to claim 1, wherein a metallic layer of the RF medium is located to provide electrical shielding between the first and second of the metallic RF transmission lines of the RF medium.

7. An electro-optic device comprising:
an electronic driver having an array of electrical outputs for outputting, in parallel, electrical radio frequency (RF) drive signals;
an RF medium including, at least, a dielectric layer and metallic RF transmission lines over the dielectric layer, each of the metallic RF transmission lines being electrically connected to receive one of the electrical RF drive signals from a corresponding one of the array of electrical outputs of the electronic driver; and
a photonic integrated circuit including a first optical modulator having serially optically connected, electro-optical modulation waveguide segments, each of the segments having a control metallic RF transmission line electrically connected to receive one of the electrical RF drive signals from a corresponding one of the metallic RF transmission lines of the RF medium; and
wherein the RF medium includes a first cavity having a portion of the electronic driver located therein and a second cavity having a portion of the photonic integrated circuit located therein.

8. The device according to claim 7, wherein, at least, some of the metallic RF transmission lines of the RF medium are vertically electrically connected to corresponding electro-optical modulation waveguide segments in the second cavity.

9. The device according to claim 7, wherein at least some of the metallic RF transmission lines of the RF medium extend underneath the photonic integrated circuit in the second cavity.

10. The device according to claim 1, wherein the electronic driver is configured to output electrical RF driver signals from the array of electrical outputs thereof in a temporally synchronized manner.

11. The device of claim 1, wherein the photonic integrated circuit includes a second optical modulator having serially optically connected, electro-optical modulation waveguide segments, each of the electro-optical modulation waveguide segments of the second optical modulator having a control metallic RF transmission line electrically connected to receive one of the electrical RF drive signals from a corresponding one of the metallic RF transmission lines of the RF medium.

12. The device according to claim 11, wherein at least some of the metallic RF transmission lines of the RF medium electrically connected to one of the first optical modulator and the second optical modulator are in a different vertical layer of the RF medium than, at least, some of the metallic RF transmission lines of the RF medium electrically connected to the other of the first optical modulator and the second optical modulator.

13. The device according to claim 12, wherein some of the metallic RF transmission lines of the RF medium electrically connected to different ones of the first optical modulator and the second optical modulator have segments vertically overlapping in the RF medium.

14. The device according to claim 12, wherein a metallic layer is located between the metallic RF transmission lines of the RF medium electrically connected to the one of the first optical modulator and the second optical modulator, and the metallic RF transmission lines of the RF medium electrically connected to the other of the first optical modulator and the second optical modulator.

15. The device according to claim 7, wherein a first of the metallic RF transmission lines of the RF medium is located in a first vertical layer thereof and a second of the metallic RF transmission lines of the RF medium is located in a different second vertical layer thereof, another dielectric layer being located between the first and second vertical layers of the first and second of the metallic RF transmission lines.

16. The device according to claim 7, wherein, at least, some of the metallic control RF transmission lines of the photonic integrated circuit have different lengths.

17. The device according to claim 7, wherein at least, some of the metallic RF transmission lines of the RF medium have different lengths.

18. The device according to claim 7, wherein a first of the metallic RF transmission lines of the RF medium has a segment located vertically, in the RF medium, over the second of the metallic RF transmission lines of the RF medium.

19. The device according to claim 7, wherein a metallic layer of the RF medium is located to provide electrical shielding between the first and second of the metallic RF transmission lines of the RF medium.

\* \* \* \* \*